United States Patent
Dai et al.

(10) Patent No.: US 11,606,775 B2
(45) Date of Patent: Mar. 14, 2023

(54) SYSTEM MESSAGE TRANSMISSION METHOD AND DEVICE

(71) Applicant: ZTE Corporation, Shenzhen (CN)

(72) Inventors: Bo Dai, Shenzhen (CN); Shuqiang Xia, Shenzhen (CN); Guanghui Yu, Shenzhen (CN); Liujun Hu, Shenzhen (CN); Yifei Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 211 days.

(21) Appl. No.: 17/060,141

(22) Filed: Oct. 1, 2020

(65) Prior Publication Data

US 2021/0029672 A1    Jan. 28, 2021

Related U.S. Application Data

(63) Continuation of application No. 15/757,152, filed as application No. PCT/CN2016/097379 on Aug. 30, 2016, now abandoned.

(30) Foreign Application Priority Data

Sep. 2, 2015  (CN) .......................... 201510557207.3
Sep. 8, 2015  (CN) .......................... 201510567936.7

(51) Int. Cl.
*H04W 72/00*   (2009.01)
*H04L 5/00*    (2006.01)
(Continued)

(52) U.S. Cl.
CPC ......... *H04W 72/005* (2013.01); *H04L 5/0048* (2013.01); *H04L 5/0053* (2013.01); *H04W 48/10* (2013.01); *H04W 72/082* (2013.01)

(58) Field of Classification Search
CPC . H04W 72/005; H04W 48/10; H04W 72/082; H04W 28/08; H04W 72/1252;
(Continued)

(56) References Cited

U.S. PATENT DOCUMENTS

2011/0274102 A1   11/2011 Kim et al.
2013/0077582 A1*  3/2013 Kim ..................... H04W 74/002
                                              370/329
(Continued)

FOREIGN PATENT DOCUMENTS

CN    102026375 A    4/2011
CN    102065516 A    5/2011
(Continued)

OTHER PUBLICATIONS

"TSGRAN; LTE; Evolved Universal Terrestrial Radio Access (E-UTRA) and Evolved Universal Terrestrial Radio Access Network (E-UTRAN); Overall description; Stage 2"; 3GPP TS 36.300 V 12.6.0 Release 12; ETSI TS 136 300 V.12.6.0 (May 2015); section 7.4; pp. 1-267.

(Continued)

*Primary Examiner* — Thai Nguyen
(74) *Attorney, Agent, or Firm* — Cantor Colburn LLP

(57) ABSTRACT

Provided are a system message transmission method and device, which relate to the field of wireless communications. According to the system message transmission method, a system message is transmitted at a preset resource location; and a physical downlink channel is transmitted according to the system message. The system message may include at least one of: frequency domain location information of a system, configuration information of a physical shared channel carrying a system message, configuration information of terminal access, available resource information of the physical downlink channel, and radio frame information.

16 Claims, 3 Drawing Sheets

A system message is transmitted at a preset resource location

A physical downlink channel is transmitted according to the system message

(51) Int. Cl.
*H04W 48/10* (2009.01)
*H04W 72/08* (2009.01)

(58) Field of Classification Search
CPC ... H04W 48/08; H04W 72/042; H04W 48/12; H04W 48/02; H04L 5/0048; H04L 5/0053; H04L 7/08; H04J 11/0023; H04J 2211/005
See application file for complete search history.

(56) References Cited

U.S. PATENT DOCUMENTS

| | | |
|---|---|---|
| 2015/0230211 A1 | 8/2015 | You |
| 2016/0077582 A1 | 3/2016 | Song |
| 2018/0227148 A1* | 8/2018 | Chatterjee ............. H04L 25/022 |
| 2018/0279257 A1 | 9/2018 | Dai et al. |
| 2018/0279268 A1* | 9/2018 | You ................... H04W 74/0833 |

FOREIGN PATENT DOCUMENTS

| | | | |
|---|---|---|---|
| CN | 103906139 A | 7/2014 | |
| GB | 2491866 A | 12/2012 | |
| JP | 2013504900 A | 2/2013 | |
| JP | 201473671 A | 4/2014 | |
| JP | 2015503881 A | 2/2015 | |
| JP | 2015511451 A | 4/2015 | |
| WO | 2013043006 A1 | 3/2013 | |
| WO | 2015080649 A1 | 6/2015 | |

OTHER PUBLICATIONS

Ericsson LM et al., "Narrowband LTE-Concept Description", 3GPP Draft; R1-154659; vol. RAN WG1, No. Beijing China, Aug. 24, 2015-Aug. 28, 2015; Aug. 23, 2015, XP05100893.
European Examination Report for corresponding application 16 840 814.4; Report dated Nov. 22, 2019.
European Search Report for corresponding application Aug. 18, 2017; Report dated Jul. 30, 2018.
International Search Report for corresponding application No. PCT/CN2016/097379 filed on Aug. 30, 2016; Report dated Nov. 18, 2016.
European Examination Report for corresponding application 16 840 814.4 dated Apr. 15, 2020.

* cited by examiner

SYSTEM MESSAGE TRANSMISSION METHOD AND DEVICE

CROSS REFERENCE TO RELATED APPLICATIONS

This application is a continuation of U.S. patent application Ser. No. 15/757,152 which was filed on Mar. 2, 2018 under 35 U.S.C. 371 as the national stage of International Patent Application Number PCT/CN2016/097379 which was filed on Aug. 30, 2016 claiming priority to Chinese Patent Application 201510557207.3 filed on Sep. 2, 2015 and Chinese Patent Application 201510567936.7 filed on Sep. 8, 2015, the contents of all of said applications are herein incorporated by reference in their entirety.

TECHNICAL FIELD

The disclosure relates to, but is not limited to, the field of wireless communications, and more particularly to a system message transmission method and device.

BACKGROUND

A Machine Type Communication (MTC) User Equipment (UE), which is also referred to as a Machine to Machine (M2M) user communication equipment, is a main application form of a current Internet Of Things (IOT). In a 3rd Generation Partnership Project (3GPP) technical report TR45.820V200, several technologies applicable to a Cell-IOT (C-IOT) are proposed. Among all the technologies, a Narrowband Long Term Evolution (NB-LTE) technology is the most attention-grabbing technology. The system bandwidth of an NB-LTE system is 200 kHz, identical to the channel bandwidth of a Global System for Mobile Communication (GSM), which brings great convenience for reusing a GSM spectrum by an NB-LTE system and reducing mutual interference between a neighbor channel and a GSM channel. In addition, the transmission bandwidth of the NB-LTE and a downlink subcarrier interval are 180 kHz and 15 kHz respectively, identical to the bandwidth and subcarrier interval of one Physical Resource Block (PRB) of an LTE system respectively. This not only facilitates reuse of relevant designs of the relevant LTE system in the NB-LTE system, but also reduces mutual interference between the two systems when a GSP spectrum reused by the NB-LTE system is adjacent to a spectrum of the LTE system.

In addition, a subcarrier interval of the relevant LTE system is 15 kHz. The LTE system supports the following six system bandwidths, i.e., 1.4 MHz, 3 MHz, 5 MHz, 10 MHz, 15 MHz and 20 MHz, and these six bandwidths respectively have 72, 150, 300, 600, 900 and 1200 available subcarriers. Considering that the transmission bandwidth and downlink subcarrier interval of the NB-LTE system are the same as the bandwidth and subcarrier interval of one PRB of the LTE system respectively, the NB-LTE system and the LTE system may coexist in the same spectrum. For example, in the LTE system of which the system bandwidth is 20 MHz, a bandwidth of 180 kHz may be allocated for sending an NB-LTE system signal. However, because partial resources of the LTE system have been pre-occupied, an effective solution for ensuring that NB-LTE system and LTE system signals are not transmitted over the same resource so as to reduce mutual interference between the two systems is not provided yet at present.

SUMMARY

The following is a brief introduction for subject matter described herein in detail. The brief introduction is not intended to restrict the scope of protection of claims.

Some embodiments of the disclosure provide a system message transmission method and device, which may reduce the interference between signals during spectrum sharing between different systems, and reduce the occurrence of simultaneous transmission of different signals over the same resource by different systems.

Some embodiments of the disclosure adopt the technical solutions as follows.

A system message transmission method may include the steps as follows.

A system message may be transmitted at a preset resource location.

A physical downlink channel may be transmitted according to the system message. The system message may include at least one of: frequency domain location information of a system, configuration information of a physical shared channel carrying a system message, configuration information of terminal access, available resource information of the physical downlink channel, and radio frame information.

In an embodiment, the available resource information of the physical downlink channel may include: information of a start Orthogonal Frequency Division Multiplexing (OFDM) symbol of the physical downlink channel in a subframe, and/or information of one or more unavailable resource elements of the physical downlink channel in a subframe, and/or information of one or more available subframes of the physical downlink channel.

In an embodiment, the method may further include a step of indicating the information of the one or more unavailable resource elements via a Cell-specific Reference Signal (CRS) port location and/or a Channel State Information Reference Signal (CSI-RS) port location. The indication via the CRS port location and/or the CSI-RS port location may be determined by a number of ports and/or a virtual cell identity.

In an embodiment, the system message may be transmitted at the preset resource location in a following manner.

The system message may be transmitted at a preset resource location via a Physical Broadcast Channel (PBCH).

In an embodiment, the preset resource location may be embodied as one of the followings. The PBCH may be located on last Y OFDM symbols of a first slot of a subframe and first X OFDM symbols of a second slot of the subframe. Alternatively, the PBCH may be located on any R OFDM symbols in first predefined OFDM symbols in a subframe, wherein R may be equal to 4, 5, 6 or 8, and the first predefined OFDM symbols may include at least one of: a second OFDM symbol of each slot, a third OFDM symbol of each slot, a fourth last OFDM symbol of each slot, and last two OFDM symbols of each slot.

In an embodiment, X may be equal to 4, 5, 6 or 7, and Y may be equal to 0, 1, 2, 3, 4 or 5.

In an embodiment, the first predefined OFDM symbols may include one of the following:
when R is equal to 4, the first predefined OFDM symbols may include last two OFDM symbols of each slot;
when R is equal to 5, the first predefined OFDM symbols may include last two OFDM symbols of each slot and a fourth last OFDM symbol of a second slot, or, the first predefined OFDM symbols may include last two OFDM symbols of each slot and a third OFDM symbol of a second slot;

when R is equal to 6, the first predefined OFDM symbols may include last two OFDM symbols of each slot, and a fourth last OFDM symbol and a second OFDM symbol of a second slot, or, the first predefined OFDM symbols may include last two OFDM symbols of each slot and a fourth last OFDM symbol of each slot, or, the first predefined OFDM symbols may include last two OFDM symbols of each slot, and a second OFDM symbol and a third OFDM symbol of a second slot; and when R is equal to 8, the first predefined OFDM symbols may include a second OFDM symbol, a third OFDM symbol and last two OFDM symbols of each slot.

In an embodiment, the PBCH and a synchronization channel may be located on adjacent subframes.

In an embodiment, the PBCH and the synchronization channel may be located on adjacent subframes which may be embodied as one of the following:

the synchronization channel may be located on a subframe #9, and the PBCH may be located on a subframe #0;

the synchronization channel may be located on a subframe #0, and the PBCH may be located on a subframe #9;

the synchronization channel may be located on a subframe #8, and the PBCH may be located on a subframe #9;

the synchronization channel may be located on a subframe #6, and the PBCH may be located on a subframe #5;

the synchronization channel may be located on a subframe #4, and the PBCH may be located on a subframe #5;

the synchronization channel may be located on a subframe #5, and the PBCH may be located on a subframe #4;

the synchronization channel may be located on a subframe #3, and the PBCH may be located on a subframe #4; and the synchronization channel may be located on a subframe #1, and the PBCH may be located on a subframe #0.

In an embodiment, the preset resource location may be embodied as follows. The PBCH may be mapped to T radio frames, and may be located on the same one or more subframes of each radio frame, wherein T may be equal to 3, 6, 9, 18 or 36.

In an embodiment, the one or more subframes may include one or more of: a subframe #0 of a radio frame, a subframe #4 of a radio frame, a subframe #5 of a radio frame, or a subframe #9 of a radio frame.

In an embodiment, the PBCH may be transmitted at an interval of Z1 radio frames, and may be repeatedly transmitted for Z2 times by every Z1*Z2 radio frames.

In an embodiment, Z1 may be equal to 4, 6, 8, 12 or 24, and Z2 may be equal to 4, 6, 8, 12 or 16.

In an embodiment, the PBCH may be demodulated by using a narrowband reference signal. The narrowband reference signal may be transmitted on one or more subframes for transmitting the PBCH, and the narrowband reference signal may be transmitted on second predefined OFDM symbols. Herein, the second predefined OFDM symbols may include last two OFDM symbols of each slot in a subframe, or, each OFDM symbol for transmitting the PBCH.

In an embodiment, the system message may be transmitted at the preset resource location in one of the following manners.

The system message may be transmitted at the preset resource location via a physical shared channel, or the system message may be transmitted at the preset resource location via a physical shared channel and a PBCH.

In an embodiment, the system message may be transmitted at the preset resource location via the physical shared channel in a manner as follows.

A start OFDM symbol of a physical shared channel carrying the system message in a subframe may be a fixed value, and corresponding available resource elements may be remaining resources after a fixed virtual cell CRS port is removed.

In an embodiment, the physical shared channel carrying the system message, a synchronization channel and the PBCH may be located on different subframes.

In an embodiment, one or more subframes of the physical shared channel carrying the system message may include one or more of a subframe #0, a subframe #4, a subframe #5 and a subframe #9.

In an embodiment, the configuration information of the physical shared channel carrying the system message may include at least one of:

a number of bits for carrying the system message in the physical shared channel;

a number of subframes occupied by the physical shared channel; and information of one or more radio frames occupied by the physical shared channel.

In an embodiment, the configuration information of terminal access may include:

whether terminal access is allowed, and/or system state information, and/or configuration information of terminal uplink access resources, wherein the system state information may be used for a terminal to determine whether and/or how to access the system.

Some embodiments of the disclosure also provide a system message transmission device. The device may include a system module and a channel module.

The system module may be configured to transmit a system message at a preset resource location.

The channel module may be configured to transmit a physical downlink channel according to the system message. The system message may include at least one of: frequency domain location information of a system, configuration information of a physical shared channel carrying a system message, configuration information of terminal access, available resource information of the physical downlink channel, and radio frame information.

In an embodiment, the available resource information of the physical downlink channel may include: information of a start OFDM symbol of the physical downlink channel in a subframe, and/or information of one or more unavailable resource elements of the physical downlink channel in a subframe, and/or information of one or more available subframes of the physical downlink channel.

The device may further include an indication module. The indication module may be configured to indicate the information of the one or more unavailable resource elements via a CRS port location and/or a CSI-RS port location. The indication via the CRS port location and/or the CSI-RS port location may be determined by a number of ports and/or a virtual cell identity.

In an embodiment, the system module may be configured to transmit a system message at a preset resource location in a following manner.

The system module may be configured to transmit the system message at the preset resource location via a PBCH.

In an embodiment, the preset resource location may be embodied as one of the followings. The PBCH may be located on last Y OFDM symbols of a first slot of a subframe and first X OFDM symbols of a second slot of the subframe. Alternatively, the PBCH may be located on any R OFDM symbols in first predefined OFDM symbols in a subframe, wherein R is equal to 4, 5, 6 or 8, and the first predefined OFDM symbols may include at least one of: a second OFDM symbol of each slot, a third OFDM symbol of each slot, a fourth last OFDM symbol of each slot, and last two OFDM symbols of each slot.

In an embodiment, X may be equal to 4, 5, 6 or 7, and Y may be equal to 0, 1, 2, 3, 4 or 5.

In an embodiment, the first predefined OFDM symbols may include one of the following:
  when R is equal to 4, the first predefined OFDM symbols may include last two OFDM symbols of each slot;
  when R is equal to 5, the first predefined OFDM symbols may include last two OFDM symbols of each slot and a fourth last OFDM symbol of a second slot, or, the first predefined
  OFDM symbols may include last two OFDM symbols of each slot and a third OFDM symbol of a second slot;
  when R is equal to 6, the first predefined OFDM symbols may include last two OFDM symbols of each slot, and a fourth last OFDM symbol and a second OFDM symbol of a second slot, or, the first predefined OFDM symbols may include last two OFDM symbols of each slot and a fourth last OFDM symbol of each slot, or, the first predefined OFDM symbols may include last two OFDM symbols of each slot, and a second OFDM symbol and a third OFDM symbol of a second slot; and
  when R is equal to 8, the first predefined OFDM symbols may include a second OFDM symbol, a third OFDM symbol and last two OFDM symbols of each slot.

In an embodiment, the PBCH and a synchronization channel may be located on adjacent subframes.

In an embodiment, the PBCH and the synchronization channel may be located on adjacent subframes which may be embodied as one of the following:
  the synchronization channel may be located on a subframe #9, and the PBCH may be located on a subframe #0;
  the synchronization channel may be located on a subframe #0, and the PBCH may be located on a subframe #9;
  the synchronization channel may be located on a subframe #8, and the PBCH may be located on a subframe #9;
  the synchronization channel may be located on a subframe #6, and the PBCH may be located on a subframe #5;
  the synchronization channel may be located on a subframe #4, and the PBCH may be located on a subframe #5;
  the synchronization channel may be located on a subframe #5, and the PBCH may be located on a subframe #4;
  the synchronization channel may be located on a subframe #3, and the PBCH may be located on a subframe #4; and
  the synchronization channel may be located on a subframe #1, and the PBCH may be located on a subframe #0.

In an embodiment, the preset resource location may be embodied as follows. The PBCH may be mapped to T radio frames, and may be located on the same one or more subframes of each radio frame, wherein T may be equal to 3, 6, 9, 18 or 36.

In an embodiment, the one or more subframes may include one or more of: a subframe #0 of a radio frame, a subframe #4 of a radio frame, a subframe #5 of a radio frame, or a subframe #9 of a radio frame.

In an embodiment, the PBCH of the system module may be transmitted at an interval of Z1 radio frames, and may be repeatedly transmitted for Z2 times by every Z1*Z2 radio frames.

In an embodiment, Z1 may be equal to 4, 6, 8, 12 or 24, and Z2 may be equal to 4, 6, 8, 12 or 16.

In an embodiment, the PBCH may be demodulated by using a narrowband reference signal. The narrowband reference signal may be transmitted on one or more subframes for transmitting the PBCH, and the narrowband reference signal may be transmitted on second predefined OFDM symbols. Herein, the second predefined OFDM symbols may include last two OFDM symbols of each slot in a subframe, or, each OFDM symbol for transmitting the PBCH.

In an embodiment, the system module may be configured to transmit a system message at a preset resource location in one of the following manners.

The system module may be configured to transmit the system message at the preset resource location via a physical shared channel, or the system module may be configured to transmit the system message at the preset resource location via a physical shared channel and a PBCH.

In an embodiment, the system module may be configured to transmit the system message at the preset resource location via the physical shared channel in a following manner.

A start OFDM symbol of a physical shared channel carrying the system message in a subframe may be a fixed value, and corresponding available resource elements may be remaining resources after a fixed virtual cell CRS port is removed.

In an embodiment, the physical shared channel carrying the system message, a synchronization channel and the PBCH may be located on different subframes.

In an embodiment, one or more subframes of the physical shared channel carrying the system message may include one or more of a subframe #0, a subframe #4, a subframe #5 and a subframe #9.

In an embodiment, the configuration information of the physical shared channel carrying the system message may include at least one of:
  a number of bits for carrying the system message in the physical shared channel;
  a number of subframes occupied by the physical shared channel; and
  information of one or more radio frames occupied by the physical shared channel.

In an embodiment, the configuration information of terminal access may include:
  whether terminal access is allowed, and/or system state information, and/or configuration information of terminal uplink access resources, wherein the system state information may be used for a terminal to determine whether and/or how to access the system.

Some embodiments of the disclosure have the beneficial effects as follows.

According to the system message transmission method and device provided in some embodiments of the disclosure, a system message may be transmitted at a preset resource location, and then a physical downlink channel may be transmitted according to the system message. By the combined use of predetermined transmission and signaling indication, the interference between signals during spectrum sharing between different systems may be reduced, and the occurrence of simultaneous transmission of different signals over the same resource by different systems may be reduced, thereby ensuring consistency between a system and a terminal, and improving the data transmission performance.

After the drawings and the detailed descriptions are read and understood, other aspects may be understood.

DETAILED DESCRIPTION OF THE EMBODIMENTS

The embodiments of the disclosure will be described below in conjunction with the drawings. It should be noted that the embodiments in the present application and the features in the embodiments may be randomly combined with each other under the condition of no conflicts.

Figure 1:
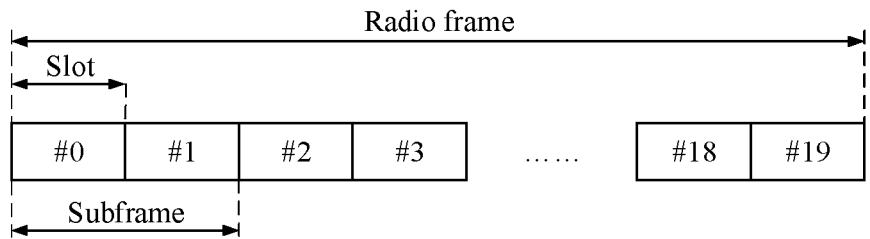
FIG. 1 is a structure diagram of an LTE system frame.

A radio frame in an LTE system may follow frame structures in a Frequency Division Duplex (FDD) mode and a Time Division Duplex (TDD) mode. The frame structure in the FDD mode is as shown in FIG. 1. A radio frame of 10 ms may consist of twenty slots of 0.5 ms, numbered as 0 to 19, and slots 2i and 2i+1 may form a subframe i of 1 ms. For a normal Cyclic Prefix (CP), each slot may contain 7 symbols of 66.7 us, wherein the CP length of the first symbol is 5.21 us, and the CP lengths of the other six symbols are 4.69 us. For an extended CP, each slot may contain 6 symbols, and the CP length of all the symbols are 16.67 us.

The number of CRS ports in the LTE system may be 1, 2 or 4, the number of CSI-RS ports may be 1, 2, 4 or 8. Different numbers of ports may correspond to different numbers of resource elements and different locations.

A downlink control channel in the LTE system may be located on first n OFDM symbols of a subframe, n being 1, 2, 3 or 4.

The NB-LTE system may adopt single-port transmission. In addition, because the bandwidth of the NB-LTE system is only 200 k, time domain resources occupied by a PBCH and a synchronization signal of the NB-LTE system are increased relative to the LTE system. Therefore, a method for mapping a PBCH and a synchronization signal of an LTE system is no longer applicable, and therefore a new method is needed. Moreover, during spectrum sharing between the NB-LTE system and the LTE system, if the NB-LTE system does not avoid using resources used by a downlink control channel and a downlink reference signal of the LTE system and still works as if no spectrum is shared and resources are independently used, the interference between signals of different systems will be caused, and different systems simultaneously may transmit different signals over the same resource, thereby affecting UE data reception. Therefore, the NB-LTE system needs to send a system message to an NB-LTE UE to inform of available resources, in order that the NB-LTE system can perform data transmission according to whether a spectrum is shared. Meanwhile, consistency between the NB-LTE system and the NB-LTE UE is also ensured.

Figure 2:
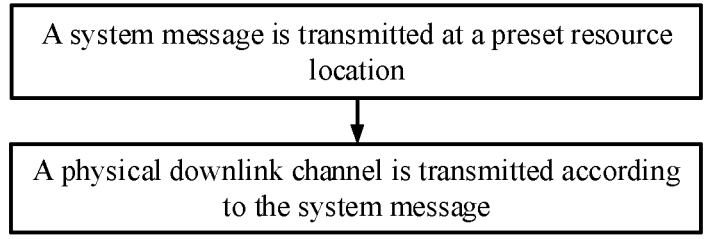
FIG. 2 is a flowchart of a system message transmission method according to an embodiment of the disclosure.

As shown in FIG. 2, an embodiment of the disclosure provides a system message transmission method, including the steps as follows.

A system message may be transmitted at a preset resource location.

A physical downlink channel may be transmitted according to the system message. The system message may include at least one of: frequency domain location information of a system, configuration information of a physical shared channel carrying a system message, configuration information of terminal access, available resource information of the physical downlink channel, and radio frame information.

The physical downlink channel may include a physical downlink shared channel and/or a physical downlink control channel.

The method in the embodiments of the disclosure may be applied to the following systems: NB-LTE, or other OFDM systems, or other narrowband systems. The transmission may include: sending and/or receiving.

Herein, the available resource information of the physical downlink channel may include: information of a start OFDM symbol of the physical downlink channel in a subframe, and/or information of one or more unavailable resource elements of the physical downlink channel in a subframe, and/or information of one or more available subframes of the physical downlink channel.

The information of one or more available subframes of the physical downlink channel may be indicated in one of the following alternative manners. The available subframes may be periodically indicated by using a bitmap. Alternatively, unavailable subframes may be periodically indicated by using a bitmap. For example, J bits may be used to indicate the availability of each subframe in J subframes. As such, each bit correspondingly indicates the availability of one subframe in J subframes, for example, 1 represents Available, and 0 represents Unavailable; or, 0 represents Available, and 1 represents Unavailable. Herein, J may be equal to 40, 80, 120, 160 or 240.

The method may further include a step of indicating the information of the one or more unavailable resource elements via a CRS port location and/or a CSI-RS port location. The indication via the CRS port location and/or the CSI-RS port location may be determined by a number of ports and/or a virtual cell identity.

The system message may be transmitted at the preset resource location in the following manner.

The system message may be transmitted at the preset resource location via a PBCH.

The PBCH may be located on last Y OFDM symbols of a first slot of a subframe and first X OFDM symbols of a second slot of the subframe.

Herein, X may be equal to 4, 5, 6 or 7, and Y may be equal to 0, 1, 2, 3, 4 or 5.

Alternatively, the PBCH may be located on any R OFDM symbols in first predefined OFDM symbols in a subframe, wherein R may be equal to 4, 5, 6 or 8. The first predefined OFDM symbols may include at least one of: a second OFDM symbol of each slot, a third OFDM symbol of each slot, a fourth last OFDM symbol of each slot, and last two OFDM symbols of each slot.

In an embodiment, when R is equal to 4, the first predefined OFDM symbols may include last two OFDM symbols of each slot.

In an embodiment, when R is equal to 5, the first predefined OFDM symbols may include last two OFDM symbols of each slot and a fourth last OFDM symbol of a second slot, or, the first predefined OFDM symbols may include last two OFDM symbols of each slot and a third OFDM symbol of a second slot.

In an embodiment, when R is equal to 6, the first predefined OFDM symbols may include last two OFDM symbols of each slot, and a fourth last OFDM symbol and a second OFDM symbol of a second slot, or, the first predefined OFDM symbols may include last two OFDM symbols of each slot and a fourth last OFDM symbol of each slot, or, the first predefined OFDM symbols may include last two OFDM symbols of each slot, and a second OFDM symbol and a third OFDM symbol of a second slot.

In an embodiment, when R is equal to 8, the first predefined OFDM symbols may include a second OFDM symbol, a third OFDM symbol and last two OFDM symbols of each slot.

A narrowband reference signal may be transmitted on second predefined OFDM symbols. The second predefined OFDM symbols may include: last two OFDM symbols of each slot in a subframe, or, each OFDM symbol for transmitting the PBCH.

The narrowband reference signal may be used to demodulate the PBCH, and the narrowband reference signal may be transmitted on one or more subframes for transmitting the PBCH.

The number of antenna ports of the narrowband reference signal may be equal to 1 or 2. A frequency domain interval of reference signals of the same port may be 6 subcarriers, and a frequency domain location offset of reference signals of the same port on adjacent OFDM symbols may be 3 subcarriers.

Initial locations of the antenna ports of the narrowband reference signal may be determined according to a cell identity.

Figure 4:
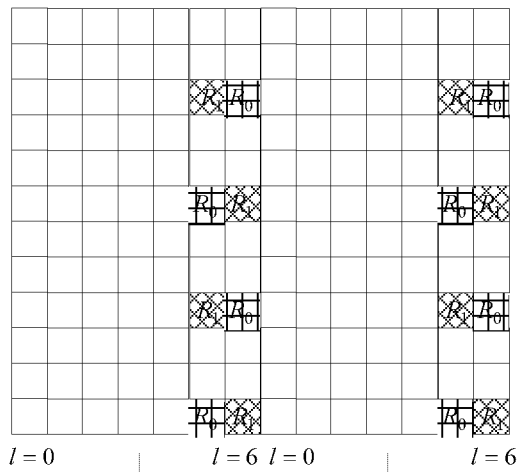
FIGS. 4 to 7 are schematic diagrams of locations of narrowband reference signals according to an embodiment of the disclosure.
Figure 6:
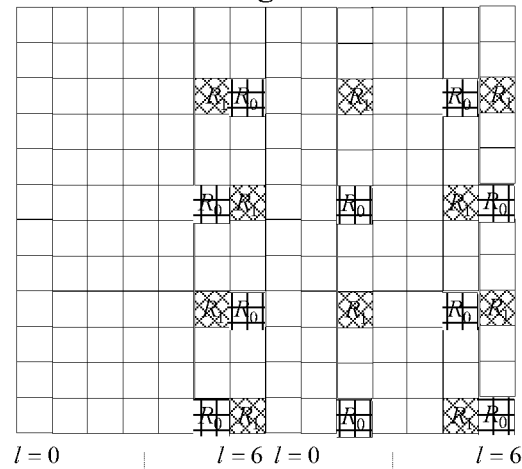

When a normal CP is adopted, as shown in FIG. 4 and FIG. 6, 1 is an OFDM symbol index.

Figure 5:
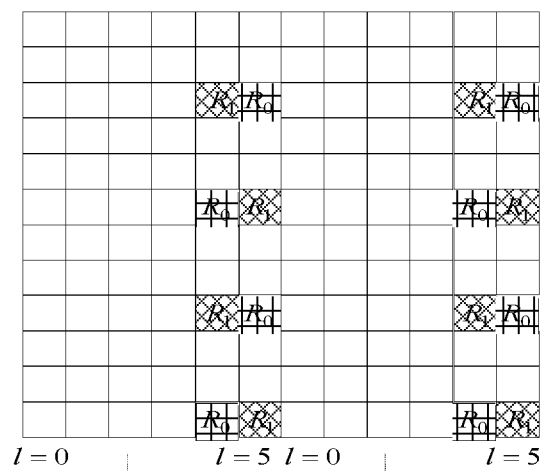
Figure 7:
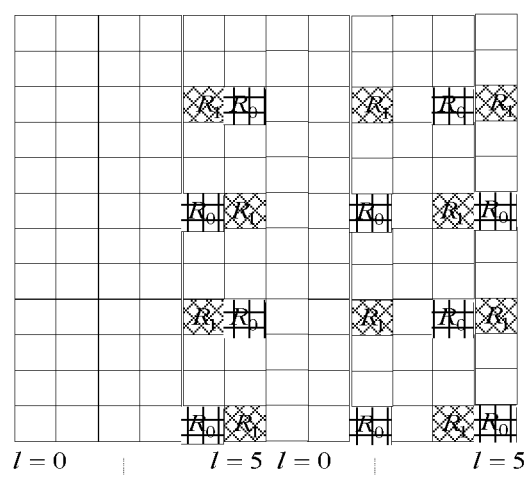

When an extended CP is adopted, as shown in FIG. 5 and FIG. 7, 1 is an OFDM symbol index.

Herein, R0 indicates a first port, and R1 indicates a second port.

In an embodiment, the first predefined symbols are OFDM symbols on which no CRS of the LTE system is sent. The transmission of a PBCH on the first predefined symbols may reduce influence of a CRS on the PBCH, and may particularly reduce mutual influence between a new system (narrowband system) and an LTE system on the same spectrum when cell identities corresponding to the two systems are different.

In addition, the adoption of the specific first predefined symbols mentioned above mainly considers influence of the narrowband reference signal on demodulation performance. Specifically, an OFDM symbol carrying the PBCH is ensured to the greatest extent to be located on an OFDM symbol on which the narrowband reference signal is located. Preferably, the first predefined OFDM symbols are selected to be in an intermediate region on an OFDM symbol on which the narrowband reference signal is located, so that good transmission performance can be obtained.

The PBCH and a synchronization channel may be located on adjacent subframes. Specifically, the locations of the PBCH and the synchronization channel may be embodied as one of the followings.

The synchronization channel may be located on a subframe #9, and the PBCH may be located on a subframe #0.

The synchronization channel may be located on a subframe #0, and the PBCH may be located on a subframe #9.

The synchronization channel may be located on a subframe #8, and the PBCH may be located on a subframe #9.

The synchronization channel may be located on a subframe #6, and the PBCH may be located on a subframe #5.

The synchronization channel may be located on a subframe #4, and the PBCH may be located on a subframe #5.

The synchronization channel may be located on a subframe #5, and the PBCH may be located on a subframe #4.

The synchronization channel may be located on a subframe #3, and the PBCH may be located on a subframe #4.

The synchronization channel may be located on a subframe #1, and the PBCH may be located on a subframe #0.

The PBCH may be mapped to T radio frames, and may be located on the same one or more subframes of each radio frame. T may be equal to 3, 6, 9, 18 or 36. The mapping mentioned herein refers to single transmission of the PBCH, and resource definition of a repeated transmission scenario of the PBCH is not involved.

The one or more subframes may include one or more of a subframe #0 of a radio frame, a subframe #4 of a radio frame, a subframe #5 of a radio frame, or a subframe #9 of a radio frame.

The PBCH may be transmitted at an interval of Z1 radio frames, and may be repeatedly transmitted for Z2 times by every Z1*Z2 radio frames. In the embodiment, Z1 may be equal to 4, 6, 8, 12 or 24, and Z2 may be equal to 4, 6, 8, 12 or 16.

The system message may be transmitted at the preset resource location in one of the manners as follows.

The system message may be transmitted at the preset resource location via a physical shared channel. Alternatively, the system message may be transmitted at the preset resource location via a physical shared channel and a PBCH. In the embodiment, a start OFDM symbol of a physical shared channel carrying the system message in a subframe may be a fixed value, and corresponding available resource elements may be remaining resources after a fixed virtual cell CRS port is removed.

The location of the virtual cell CRS port may be the same as a resource location corresponding to a CRS port (single port, two ports, and four ports) in a relevant LTE system. The resource elements corresponding to a four-port CRS in the relevant LTE system may be selected to serve as resource elements corresponding to the virtual cell CRS port.

The physical shared channel carrying the system message, the synchronization channel and the PBCH may be located on different subframes. One or more subframes of the physical shared channel carrying the system message may include one or more of a subframe #0, a subframe #4, a subframe #5 and a subframe #9.

For example, the synchronization channel and the PBCH may be located on the subframe #4 and the subframe #5 (the two subframes may be exchanged) of a radio frame respectively, and the physical shared channel carrying the system message may be located on the subframe #9 and/or the subframe #0. Alternatively, the synchronization channel and the PBCH may be located on the subframe #9 and the subframe #0 (the two subframes may be exchanged) of a radio frame respectively, and the physical shared channel carrying the system message may be located on the subframe #4 and/or the subframe #5.

The physical shared channel carrying the system message may be located on W successive radio frames, W being equal to 3, 6, 9 or 12.

Figure 3:
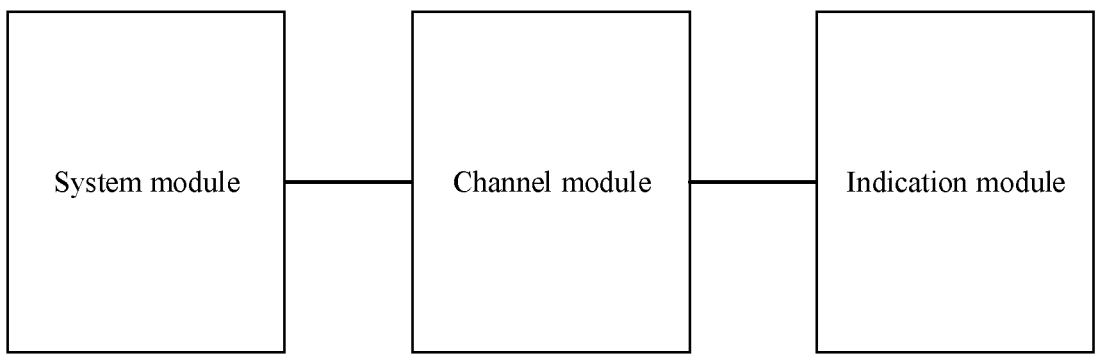
FIG. 3 is a structure diagram of a system message transmission device according to an embodiment of the disclosure.

As shown in FIG. 3, a system message transmission device may include a system module and a channel module.

The system module may be configured to transmit a system message at a preset resource location.

The channel module may be configured to transmit a physical downlink channel according to the system message. The system message may include at least one of: frequency domain location information of a system, configuration information of a physical shared channel carrying a system message, configuration information of terminal access, available resource information of the physical downlink channel, and radio frame information.

The available resource information of the physical downlink channel may include: information of a start OFDM symbol of the physical downlink channel in a subframe, and/or information of one or more unavailable resource elements of the physical downlink channel in a subframe, and/or information of one or more available subframes of the physical downlink channel.

The device may further include an indication module.

The indication module may be configured to indicate the information of the one or more unavailable resource elements via a CRS port location and/or a CSI-RS port location.

In an embodiment, the indication via the CRS port location and/or the CSI-RS port location may be determined by a number of ports and/or a virtual cell identity.

Herein, the virtual cell identity is mainly used to indicate a cell identity of an LTE system during coexistence of a new system (narrowband system) and the LTE system, so that the reference signal location can be determined.

The virtual cell identity may include an LTE cell identity or a predefined offset value, the predefined offset value being equal to 0, 1, 2, 3, 4 or 5.

The information of one or more available subframes of the physical downlink channel may be indicated in one of the following alternative manners. The available subframes may be periodically indicated by using a bitmap. Alternatively, unavailable subframes may be periodically indicated by using a bitmap. For example, J bits may be used to indicate the availability of each subframe in J subframes. As such, each bit correspondingly indicates the availability of one subframe in J subframes, for example, 1 represents Available, and 0 represents Unavailable; or, 0 represents Available, and 1 represents Unavailable. Herein, J may be equal to 40, 80, 120, 160 or 240.

The system module may be configured to transmit a system message at a preset resource location in the following manner.

The system module may be configured to transmit the system message at the preset resource location via a PBCH.

The preset resource location may be embodied as follows. The PBCH may be located on last Y OFDM symbols of a first slot of a subframe and first X OFDM symbols of a second slot of the subframe.

In the embodiment, X may be equal to 4, 5, 6 or 7, and Y may be equal to 0, 1, 2, 3, 4 or 5.

Alternatively, the PBCH may be located on any R OFDM symbols in first predefined OFDM symbols in a subframe, wherein R may be equal to 4, 5, 6 or 8. The first predefined OFDM symbols may include at least one of: a second OFDM symbol of each slot, a fourth last OFDM symbol of each slot, last two OFDM symbols of each slot, and a third OFDM symbol of each slot.

In an embodiment, when R is equal to 4, the first predefined OFDM symbols may include last two OFDM symbols of each slot.

In an embodiment, when R is equal to 5, the first predefined OFDM symbols may include last two OFDM symbols of each slot and a fourth last OFDM symbol of a second slot, or, the first predefined OFDM symbols may include last two OFDM symbols of each slot and a third OFDM symbol of a second slot.

In an embodiment, when R is equal to 6, the first predefined OFDM symbols may include last two OFDM symbols of each slot, and a fourth last OFDM symbol and a second OFDM symbol of a second slot, or, the first predefined OFDM symbols may include last two OFDM symbols of each slot and a fourth last OFDM symbol of each slot, or, the first predefined OFDM symbols may include last two OFDM symbols of each slot, and a second OFDM symbol and a third OFDM symbol of a second slot.

In an embodiment, when R is equal to 8, the first predefined OFDM symbols may include a second OFDM symbol, a third OFDM symbol and last two OFDM symbols of each slot.

A narrowband reference signal may be transmitted on second predefined OFDM symbols. The second predefined OFDM symbols may include: last two OFDM symbols of each slot in a subframe, or, each OFDM symbol for transmitting the PBCH.

The narrowband reference signal may be used to demodulate the PBCH, and the narrowband reference signal may be transmitted on one or more subframes for transmitting the PBCH.

The number of antenna ports of the narrowband reference signal may be equal to 1 or 2. A frequency domain interval of reference signals of the same port may be 6 subcarriers, and a frequency domain location offset of reference signals of the same port on adjacent OFDM symbols may be 3 subcarriers.

Initial locations of the antenna ports of the narrowband reference signal may be determined according to a cell identity.

The PBCH and a Synchronization Channel May be Located on Adjacent Subframes

The PBCH and a synchronization channel may be located on adjacent subframes. Specifically, the locations of the PBCH and the synchronization channel may be embodied as one of the followings.

The synchronization channel may be located on a subframe #9, and the PBCH may be located on a subframe #0.

The synchronization channel may be located on a subframe #0, and the PBCH may be located on a subframe #9.

The synchronization channel may be located on a subframe #8, and the PBCH may be located on a subframe #9.

The synchronization channel may be located on a subframe #6, and the PBCH may be located on a subframe #5.

The synchronization channel may be located on a subframe #4, and the PBCH may be located on a subframe #5.

The synchronization channel may be located on a subframe #5, and the PBCH may be located on a subframe #4.

The synchronization channel may be located on a subframe #3, and the PBCH may be located on a subframe #4.

The synchronization channel may be located on a subframe #1, and the PBCH may be located on a subframe #0.

The PBCH may be mapped to T radio frames, and may be located on the same one or more subframes of each radio frame.

The one or more subframes may include one or more of a subframe #0 of a radio frame, a subframe #4 of a radio frame, a subframe #5 of a radio frame, or a subframe #9 of a radio frame.

The PBCH of the system module may be transmitted at an interval of Z1 radio frames, and may be repeatedly transmitted for Z2 times by every Z1*Z2 radio frames.

In the embodiment, Z1 may be equal to 4, 6, 8, 12 or 24, and Z2 may be equal to 4, 6, 8, 12 or 16.

The system module may be configured to transmit a system message at a preset resource location in one of the following manners.

The system module may be configured to transmit the system message at the preset resource location via a physical shared channel. Alternatively, the system module may be configured to transmit the system message at the preset resource location via a physical shared channel and a PBCH.

The system message may be transmitted at the preset resource location via the physical shared channel in a following manner.

A start OFDM symbol of a physical shared channel carrying the system message in a subframe may be a fixed value, and corresponding available resource elements may be remaining resources after a fixed virtual cell CRS port is removed.

The physical shared channel carrying the system message, the synchronization channel and the PBCH may be located on different subframes.

One or more subframes of the physical shared channel carrying the system message may include one or more of a subframe #0, a subframe #4, a subframe #5 and a subframe #9.

First Embodiment

The information of the start OFDM symbol may include two or four states.

In the embodiment, a 1 bit signaling may be included to represent available resource information of the physical downlink channel.

Two resource mapping modes may be predefined and indicated by 1 bit signaling. The available resource information of the physical downlink channel can be indicated by the signaling.

For example, the first mapping mode may include: a physical downlink channel is mapped starting from a first OFDM symbol of a subframe, and/or corresponding available resource elements may be remaining resources after a fixed single-port virtual cell CRS is removed; and the second mapping mode may include: a physical downlink channel is mapped starting from a fourth OFDM symbol of a subframe, and/or corresponding available resource elements may be remaining resources after a fixed four-port virtual cell CRS is removed.

Alternatively,
the first mapping mode may include: a physical downlink channel is mapped starting from a first OFDM symbol of a subframe, and/or corresponding available resource elements may be remaining resources after a fixed single-port virtual cell CRS is removed; and the second mapping mode may include: a physical downlink channel is mapped starting from a fifth OFDM symbol of a subframe, and/or corresponding available resource elements may be remaining resources after a fixed four-port virtual cell CRS is removed.

An alternative manner is: defining signaling respectively for the information of the start OFDM symbol of the physical downlink channel in a subframe and the information of one or more available resource elements of the physical downlink channel in a subframe.

The information of the start OFDM symbol of the physical downlink channel in a subframe may occupy 1 bit, indicating a first OFDM symbol, or a $k^{th}$ OFDM symbol, where k is equal to 3, 4 or 5 optionally. Alternatively, the information of the start OFDM symbol of the physical downlink channel in a subframe may occupy 2 bits, indicating first, second, third or fourth OFDM symbol.

The information of one or more available resource elements of the physical downlink channel in a subframe may be indicated via a CRS port location and/or a CSI-RS port location. The CRS port location may be 1, 2 or 4, or, the CRS port location may be 1 or 4.

The CSI-RS port location may be Null, or may be one or more selected CSI-RS resource configuration indexes in a relevant LTE system. The CSI-RS port location being Null represents that no CSI-RS is sent.

Second Embodiment

Because a CRS is only located on first two OFDM symbols on a subframe of an LTE system Multimedia Broadcast multicast service Signal Frequency Network (MBSFN) and a PBCH needs to be demodulated by the CRS and/or a synchronization channel, the PBCH may be located on non-MBSFN subframes (0, 4, 5, 9).

Locating of a synchronization signal on an MBSFN subframe may avoid influence of a CRS of an LTE system on the synchronization signal. However, this may limit multicast service transmission. Therefore, a PBCH mapping solution is provided for two scenarios, i.e., a scenario in which the synchronization signal is located on MBSFN subframes (1, 2, 3, 6, 7, 8) and a scenario in which the synchronization signal is not located on MBSFN subframes (0, 4, 5, 9). The mapping solution may include transmitting the system message at the preset resource location via a PBCH.

The preset resource location may be embodied as follows. The PBCH may be located on last Y OFDM symbols of a first slot of a subframe and first X OFDM symbols of a second slot of the subframe.

In the embodiment, X may be equal to 4, 5, 6 or 7, and Y may be equal to 0, 1, 2, 3, 4 or 5.

Alternatively, the PBCH may be located on any R OFDM symbols in first predefined OFDM symbols in a subframe, wherein R may be equal to 4, 5, 6 or 8, and the first predefined OFDM symbols may include at least one of: a second OFDM symbol of each slot, a fourth last OFDM symbol of each slot, last two OFDM symbols of each slot, and a third OFDM symbol of each slot.

The above description indicates that a PBCH may be located on an adjacent subframe different from the subframe of a synchronization channel. However, it is not limited that a PBCH is present on an adjacent subframe of a synchronization channel for sure. The number of subframes occupied by the synchronization channel may be greater than or equal to the number of subframes occupied by the PBCH.

For example, primary synchronization signals may be located on subframes #k of odd-indexed radio frames, and secondary synchronization signals may be located on subframes #k of even-indexed radio frames, wherein k may be equal to 1, 2, 3, 6, 7 or 8. Alternatively, primary synchronization signals may be located on subframes #k of even-indexed radio frames, and secondary synchronization signals may be located on subframes #k of odd-indexed radio frames, wherein k may be equal to 1, 2, 3, 6, 7 or 8. The subframes may be numbered starting from 0.

Alternatively, the primary synchronization signals may be located on subframes #k of odd-indexed radio frames, and the secondary synchronization signals may be located on subframes #k of even-indexed radio frames, wherein k may be equal to 0, 4, 5 or 9. Alternatively, the primary synchronization signals may be located on subframes #k of even-indexed radio frames, and the secondary synchronization signals may be located on subframes #k of odd-indexed radio frames, wherein k may be equal to 0, 4, 5 or 9. The subframes may be numbered starting from 0.

The PBCH may be mapped to a subframe #k of each radio frame by taking 6 successive radio frames as a period, wherein k may be equal to 0, 4, 5 or 9. Alternatively, the PBCH may be mapped to subframes #k of first three radio frames within each period by taking 6 successive radio frames as a period, wherein k may be equal to 0, 4, 5 or 9. Alternatively, the PBCH may be mapped to a subframe #k of each radio frame by taking 8 successive radio frames as a period, wherein k may be equal to 0, 4, 5 or 9.

Third Embodiment

In this embodiment, the transmission may include: sending and/or receiving.

The sending process may include steps as follows. An NB-LTE base station sends a system message to an NB-LTE terminal, and the NB-LTE base station sends a physical downlink channel to the NB-LTE terminal according to the system message.

The NB-LTE base station may send a system message to the NB-LTE terminal at a preset resource location.

The NB-LTE base station may send a physical downlink channel to the NB-LTE terminal according to the system message. The system message may include at least one of: frequency domain location information of a system, configuration information of a physical shared channel carrying a system message, configuration information of terminal access, available resource information of the physical downlink channel, and radio frame information.

The NB-LTE frequency domain location information is mainly used to generate a CRS sequence. The CRS sequence may be generated based on an LTE system CRS sequence generation method. Therefore, it may be needed to determine a frequency domain location corresponding to NB-LTE to generate the CRS sequence.

The configuration information of a physical shared channel carrying a system message may include at least one of: a number of bits for carrying the system message in the physical shared channel, a number of subframes occupied by the physical shared channel, and information of one or more radio frames occupied by the physical shared channel.

The configuration information of terminal access may include: whether terminal access is allowed, and/or system state information, and/or configuration information of terminal uplink access resources.

The system state information may be used for a terminal to determine whether and/or how to access the system.

The available resource information of the physical downlink channel may include:

information of a start OFDM symbol of the physical downlink channel in a subframe, and/or information of one or more unavailable resource elements of the physical downlink channel in a subframe, and/or information of one or more available subframes of the physical downlink channel.

The information of one or more available subframes of the physical downlink channel may be indicated in one of the following manners. The available subframes may be indicated periodically by using a bitmap. Alternatively, unavailable subframes may be indicated periodically by using a bitmap. For example, J bits may be used to indicate the availability of each subframe in J subframes. As such, each bit correspondingly indicates the availability of one subframe in J subframes, for example, 1 represents Available, and 0 represents Unavailable; or, 0 represents Available, and 1 represents Unavailable. Herein, J may be 40, 80, 120, 160 or 240.

The information of the one or more unavailable resource elements may be indicated via a CRS port location and/or a CSI-RS port location. The indication via the CRS port location and/or the CSI-RS port location may be determined by a number of ports and/or a virtual cell identity.

The system message may be transmitted at a preset resource location in the following manner. The system message may be transmitted at a preset resource location via a PBCH.

The preset resource location may be embodied as follows. The PBCH may be located on last Y OFDM symbols of a first slot of a subframe and first X OFDM symbols of a second slot of the subframe.

In the embodiment, X may be equal to 4, 5, 6 or 7, and Y may be equal to 0, 1, 2, 3, 4 or 5.

The PBCH may be located on any R OFDM symbols in first predefined OFDM symbols in a subframe, wherein R may be equal to 4, 5, 6 or 8. The first predefined OFDM symbols may include at least one of: a second OFDM symbol of each slot, a fourth last OFDM symbol of each slot, last two OFDM symbols of each slot, and a third OFDM symbol of each slot.

In an embodiment, when R is equal to 4, the first predefined OFDM symbols may include last two OFDM symbols of each slot.

In an embodiment, when R is equal to 5, the first predefined OFDM symbols may include last two OFDM symbols of each slot and a fourth last OFDM symbol of a second slot, or, the first predefined OFDM symbols may include last two OFDM symbols of each slot and a third OFDM symbol of a second slot.

In an embodiment, when R is equal to 6, the first predefined OFDM symbols may include last two OFDM symbols of each slot, and a fourth last OFDM symbol and a second OFDM symbol of a second slot, or, the first predefined OFDM symbols may include last two OFDM symbols of each slot and a fourth last OFDM symbol of each slot, or, the first predefined OFDM symbols may include last two OFDM symbols of each slot, and a second OFDM symbol and a third OFDM symbol of a second slot.

In an embodiment, when R is equal to 8, the first predefined OFDM symbols may include a second OFDM symbol, a third OFDM symbol and last two OFDM symbols of each slot.

The PBCH and a synchronization channel may be located on adjacent subframes.

The PBCH and a synchronization channel may be located on adjacent subframes which may be embodied as one of the following:

the synchronization channel may be located on a subframe #9, and the PBCH may be located on a subframe #0;

the synchronization channel may be located on a subframe #0, and the PBCH may be located on a subframe #9;

the synchronization channel may be located on a subframe #8, and the PBCH may be located on a subframe #9;

the synchronization channel may be located on a subframe #6, and the PBCH may be located on a subframe #5;

the synchronization channel may be located on a subframe #4, and the PBCH may be located on a subframe #5;

the synchronization channel may be located on a subframe #5, and the PBCH may be located on a subframe #4;

the synchronization channel may be located on a subframe #3, and the PBCH may be located on a subframe #4; and the synchronization channel may be located on a subframe #1, and the PBCH may be located on a subframe #0.

The preset resource location may be embodied as follows. The PBCH may be mapped to T radio frames, and may be located on the same one or more subframes of each radio frame.

The one or more subframes may include one or more of a subframe #0 of a radio frame, a subframe #4 of a radio frame, a subframe #5 of a radio frame, or a subframe #9 of a radio frame.

The PBCH may be transmitted at an interval of Z1 radio frames, and may be repeatedly transmitted for Z2 times by every Z1*Z2 radio frames.

In the embodiment, Z1 may be equal to 4, 6, 8, 12 or 24, and Z2 may be equal to 4, 6, 8, 12 or 16.

The system message may be transmitted at a preset resource location in one of the following manners.

The system message may be transmitted at a preset resource location via a physical shared channel. Alternatively, the system message may be transmitted at a preset resource location via a physical shared channel and a PBCH.

The system message may be transmitted at a preset resource location via a physical shared channel in the following manner.

A start OFDM symbol of a physical shared channel carrying the system message in a subframe may be a fixed value, and corresponding available resource elements may be remaining resources after a fixed virtual cell CRS port is removed.

The physical shared channel carrying the system message, the synchronization channel and the PBCH may be located on different subframes.

One or more subframes of the physical shared channel carrying the system message may include one or more of a subframe #0, a subframe #4, a subframe #5 and a subframe #9.

The receiving process may include the following steps. The NB-LTE terminal receives a system message sent by the NB-LTE base station, and the NB-LTE terminal receives a physical downlink channel according to the system message.

Herein, the system message may include at least one of: frequency domain location information of a system, configuration information of a physical shared channel carrying a system message, configuration information of terminal access, available resource information of the physical downlink channel, and radio frame information.

The available resource information of the physical downlink channel may include: information of a start OFDM symbol of the physical downlink channel in a subframe, and/or information of one or more unavailable resource elements of the physical downlink channel in a subframe, and/or information of one or more available subframes of the physical downlink channel.

The information of one or more available subframes of the physical downlink channel may be indicated in one of the following alternative manners. The available subframes may be indicated periodically by using a bitmap. Alternatively, the unavailable subframes may be indicated periodically by using a bitmap. For example, J bits may be used to indicate the availability of each subframe in J subframes. As such, each bit correspondingly indicates the availability of one subframe in J subframes, for example, 1 represents Available, and 0 represents Unavailable; or, 0 represents Available, and 1 represents Unavailable. Herein, J may be 40, 80, 120, 160 or 240.

The information of the one or more unavailable resource elements may be indicated via a CRS port location and/or a CSI-RS port location. The indication via the CRS port location and/or the CSI-RS port location may be determined by a number of ports and/or a virtual cell identity.

The system message may be transmitted at a preset resource location in the following manner. The system message may be transmitted at a preset resource location via a PBCH.

The preset resource location may be embodied as follows. The PBCH may be located on last Y OFDM symbols of a first slot of a subframe and first X OFDM symbols of a second slot of the subframe.

In the embodiment, X may be equal to 4, 5, 6 or 7, and Y may be equal to 0, 1, 2, 3, 4 or 5.

The PBCH may be located on any R OFDM symbols in first predefined OFDM symbols in a subframe, wherein R may be equal to 4, 5, 6 or 8. The first predefined OFDM symbols may include at least one of: a second OFDM symbol of each slot, a fourth last OFDM symbol of each slot, last two OFDM symbols of each slot, and a third OFDM symbol of each slot.

In an embodiment, when R is equal to 4, the first predefined OFDM symbols may include last two OFDM symbols of each slot.

In an embodiment, when R is equal to 5, the first predefined OFDM symbols may include last two OFDM symbols of each slot and a fourth last OFDM symbol of a second slot, or, the first predefined OFDM symbols may include last two OFDM symbols of each slot and a third OFDM symbol of a second slot.

In an embodiment, when R is equal to 6, the first predefined OFDM symbols may include last two OFDM symbols of each slot, and a fourth last OFDM symbol and a second OFDM symbol of a second slot, or, the first predefined OFDM symbols may include last two OFDM symbols of each slot and a fourth last OFDM symbol of each slot, or, the first predefined OFDM symbols may include last two OFDM symbols of each slot, and a second OFDM symbol and a third OFDM symbol of a second slot.

In an embodiment, when R is equal to 8, the first predefined OFDM symbols may include a second OFDM symbol, a third OFDM symbol and last two OFDM symbols of each slot.

The PBCH and a synchronization channel may be located on adjacent subframes.

The PBCH and a synchronization channel may be located on adjacent subframes which may be embodied as one of the following:

the synchronization channel may be located on a subframe #9, and the PBCH may be located on a subframe #0;

the synchronization channel may be located on a subframe #0, and the PBCH may be located on a subframe #9;

the synchronization channel may be located on a subframe #8, and the PBCH may be located on a subframe #9;

the synchronization channel may be located on a subframe #6, and the PBCH may be located on a subframe #5;

the synchronization channel may be located on a subframe #4, and the PBCH may be located on a subframe #5;

the synchronization channel may be located on a subframe #5, and the PBCH may be located on a subframe #4;

the synchronization channel may be located on a subframe #3, and the PBCH may be located on a subframe #4; and the synchronization channel may be located on a subframe #1, and the PBCH may be located on a subframe #0.

The preset resource location may be embodied as follows. The PBCH may be mapped to T radio frames, and may be located on the same one or more subframes of each radio frame.

The one or more subframes may include one or more of a subframe #0 of a radio frame, a subframe #4 of a radio frame, a subframe #5 of a radio frame, or a subframe #9 of a radio frame.

The PBCH may be transmitted at an interval of Z1 radio frames, and may be repeatedly transmitted for Z2 times by every Z1*Z2 radio frames.

In the embodiment, Z1 may be equal to 4, 6, 8, 12 or 24, and Z2 may be equal to 4, 6, 8, 12 or 16.

The system message may be transmitted at a preset resource location in one of the following manners.

The system message may be transmitted at a preset resource location via a physical shared channel. Alternatively, the system message may be transmitted at a preset resource location via a physical shared channel and a PBCH.

The system message may be transmitted at a preset resource location via a physical shared channel in the following manner.

A start OFDM symbol of a physical shared channel carrying the system message in a subframe may be a fixed value, and corresponding available resource elements may be remaining resources after a fixed virtual cell CRS port is removed.

The physical shared channel carrying the system message, the synchronization channel and the PBCH may be located on different subframes.

One or more subframes of the physical shared channel carrying the system message may include one or more of a subframe #0, a subframe #4, a subframe #5 and a subframe #9.

Fourth Embodiment

The system message may include available resource information and radio frame information of the physical downlink channel and may be carried by a PBCH.

Two resource mapping modes are predefined, and indicated by 1 bit signaling. The available resource information of the physical downlink channel may be indicated by the signaling.

The available resource information of the physical downlink channel may include information of a start OFDM symbol of the physical shared channel in a subframe and information of one or more available resource elements of the physical shared channel in a subframe.

A first mapping mode may include: a physical downlink channel is mapped starting from a first OFDM symbol of a subframe, and corresponding available resource elements may be remaining resources after a fixed single-port virtual cell CRS is removed.

A second mapping mode may include: a physical downlink channel is mapped starting from a fourth OFDM symbol of a subframe, and corresponding available resource elements may be remaining resources after a fixed four-port virtual cell CRS is removed.

The synchronization channel may be located on a subframe #9 of a radio frame, and the PBCH may be located on a subframe #0 of the radio frame. Alternatively, the PBCH may be located on a subframe #9 of a radio frame, and the synchronization channel may be located on a subframe #0 of the radio frame. Alternatively, the synchronization channel may be located on a subframe #4 of a radio frame, and the PBCH may be located on a subframe #5 of the radio frame. Alternatively, the synchronization channel may be located on a subframe #5 of a radio frame, and the PBCH may be located on a subframe #4 of the radio frame.

The PBCH may be located on last Y OFDM symbols of a first slot of a subframe and first X OFDM symbols of a second slot of the subframe, wherein X may be equal to 4, 5, 6 or 7, and Y may be equal to 0, 1, 2, 3, 4 or 5.

The PBCH may be transmitted at an interval of Z1 radio frames, and may be repeatedly transmitted for Z2 times by every Z1*Z2 radio frames. Herein, Z1 may be equal to 6, 8, 12 or 24, and Z2 may be equal to 4, 6, 8, 12 or 16.

For example, the symbol may include first four or five OFDM symbols of a second slot of a subframe, or, the last OFDM symbol of a first slot of a subframe and first four OFDM symbols of a second slot of the subframe, or, last two OFDM symbols of a first slot of a subframe and first four OFDM symbols of a second slot of the subframe, or, last two OFDM symbols of a first slot of a subframe and first six OFDM symbols of a second slot of the subframe, or, last three OFDM symbols of a first slot of a subframe and first five OFDM symbols of a second slot of the subframe, or, last five OFDM symbols of a first slot of a subframe and first seven OFDM symbols of a second slot of the subframe, or, last three OFDM symbols of a first slot of a subframe and all OFDM symbols of a second slot of the subframe.

The mapping method may reduce the number of subframes for mapping a PBCH and reduce the transmission delay, and different CP types may adopt a unified design solution to the greatest extent.

The PBCH may be mapped to six successive radio frames, and may be located on a fixed subframe #Y1 of each radio frame. Y1 may be equal to one or more of 0, 4, 5 and 9. The PBCH may be transmitted for four times within each period by taking 24 radio frames as a period.

Alternatively, the PBCH may be mapped to first three successive radio frames of every six radio frames, and may be located on a fixed subframe #Y1 of each radio frame. Y1 may be equal to one or more of 0, 4, 5 and 9. The PBCH may be transmitted for four times within each period by taking 24 radio frames as a period.

Alternatively, the PBCH may be mapped to eight successive radio frames, and may be located on a fixed subframe #Y1 of each radio frame. Y1 may be equal to one or more of 0, 4, 5 and 9. The PBCH may be transmitted for eight times within each period by taking 64 radio frames as a period.

Alternatively, the PBCH may be mapped to eight successive radio frames, and may be located on a fixed subframe #Y1 of each radio frame. Y1 may be equal to one or more of 0, 4, 5 and 9. The PBCH may be transmitted for six times within each period by taking 48 radio frames as a period.

Alternatively, the PBCH may be mapped to eight successive radio frames, and may be located on a fixed subframe #Y1 of each radio frame. Y1 may be equal to one or more of 0, 4, 5 and 9. The PBCH may be transmitted for 12 times within each period by taking 96 radio frames as a period.

Fifth Embodiment

The system message may include frequency domain location information of a system, configuration information of a physical shared channel carrying a system message, configuration information of terminal access, and radio frame information. The system message may be carried by a PBCH.

The synchronization channel may be located on a subframe #8 of a radio frame, and the PBCH may be located on a subframe #9 of the radio frame. Alternatively, the synchronization channel may be located on a subframe #6 of a radio frame, and the PBCH may be located on a subframe #5 of the radio frame. Alternatively, the synchronization channel may be located on a subframe #3 of a radio frame, and the PBCH may be located on a subframe #4 of the radio frame. Alternatively, the synchronization channel may be located on a subframe #1 of a radio frame, and the PBCH may be located on a subframe #0 of the radio frame.

The PBCH may be located on last Y OFDM symbols of a first slot of a subframe and first X OFDM symbols of a second slot of the subframe, wherein X may be equal to 4, 5, 6 or 7, and Y may be equal to 0, 1, 2, 3, 4 or 5.

The PBCH may be transmitted at an interval of Z1 radio frames, and may be repeatedly transmitted for Z2 times by every Z1*Z2 radio frames. Z1 may be equal to 6, 8, 12 or 24, and Z2 may be equal to 4, 6, 8, 12 or 16.

For example, the symbol may include first four or five OFDM symbols of a second slot of a subframe, or, the last OFDM symbol of a first slot of a subframe and first four OFDM symbols of a second slot of the subframe, or, last two OFDM symbols of a first slot of a subframe and first four OFDM symbols of a second slot of the subframe, or, last two OFDM symbols of a first slot of a subframe and first six OFDM symbols of a second slot of the subframe, or, last three OFDM symbols of a first slot of a subframe and first five OFDM symbols of a second slot of the subframe, or, last five OFDM symbols of a first slot of a subframe and first seven OFDM symbols of a second slot of the subframe, or, last three OFDM symbols of a first slot of a subframe and all OFDM symbols of a second slot of the subframe.

The mapping method may reduce the number of subframes for mapping a PBCH and reduce the transmission delay. Different CP types may adopt a unified design solution to the greatest extent.

The PBCH may be mapped to six successive radio frames, and may be located on a fixed subframe #Y1 of each radio frame. Y1 may be equal to one or more of 0, 4, 5 and 9. The PBCH may be transmitted for four times within each period by taking 24 radio frames as a period.

Alternatively, the PBCH may be mapped to first three successive radio frames of every six radio frames, and may be located on a fixed subframe #Y1 of each radio frame. Y1 may be equal to one or more of 0, 4, 5 and 9. The PBCH may be transmitted for four times within each period by taking 24 radio frames as a period.

Sixth Embodiment

The system message may include available resource information of the physical downlink channel, radio frame information, frequency domain location information of a system, configuration information of a physical shared channel carrying a system message, and configuration information of terminal access.

The radio frame information, the NB-LTE frequency domain location information and the configuration information of the physical shared channel carrying the system message may be carried by a PBCH.

The synchronization channel may be located on a subframe #8 of a radio frame, and the PBCH may be located on a subframe #9 of the radio frame. Alternatively, the synchronization channel may be located on a subframe #6 of a radio frame, and the PBCH may be located on a subframe #5 of the radio frame. Alternatively, the synchronization channel may be located on a subframe #3 of a radio frame, and the PBCH may be located on a subframe #4 of the radio frame. Alternatively, the synchronization channel may be located on a subframe #1 of a radio frame, and the PBCH may be located on a subframe #0 of the radio frame.

The PBCH may be located on last Y OFDM symbols of a first slot of a subframe and first X OFDM symbols of a second slot of the subframe, wherein X may be equal to 4, 5, 6 or 7, and Y may be equal to 0, 1, 2, 3, 4 or 5.

The PBCH may be transmitted at an interval of Z1 radio frames, and may be repeatedly transmitted for Z2 times by every Z1*Z2 radio frames. Z1 may be equal to 6, 8, 12 or 24, and Z2 may be equal to 4, 6, 8, 12 or 16.

For example, the symbol may include first four or five OFDM symbols of a second slot of a subframe, or, the last OFDM symbol of a first slot of a subframe and first four OFDM symbols of a second slot of the subframe, or, last two OFDM symbols of a first slot of a subframe and first four OFDM symbols of a second slot of the subframe, or, last two OFDM symbols of a first slot of a subframe and first six OFDM symbols of a second slot of the subframe, or, last three OFDM symbols of a first slot of a subframe and first five OFDM symbols of a second slot of the subframe, or, last five OFDM symbols of a first slot of a subframe and first seven OFDM symbols of a second slot of the subframe, or, last three OFDM symbols of a first slot of a subframe and all OFDM symbols of a second slot of the subframe.

The mapping method may reduce the number of subframes for mapping a PBCH and reduce the transmission delay. Different CP types may adopt a unified design solution to the greatest extent.

The PBCH may be mapped to six successive radio frames, and may be located on a fixed subframe #Y1 of each radio frame. Y1 may be equal to one or more of 0, 4, 5 and 9. The PBCH may be transmitted for four times within each period by taking 24 radio frames as a period.

Alternatively, the PBCH may be mapped to first three successive radio frames of every six radio frames, and may be located on a fixed subframe #Y1 of each radio frame. Y1 may be equal to one or more of 0, 4, 5 and 9. The PBCH may be transmitted for four times within each period by taking 24 radio frames as a period.

The available resource information of the physical downlink channel and the configuration information of terminal access may be carried by a PBCH. A start OFDM symbol of a physical shared channel carrying the system message in a subframe may be a first OFDM symbol, and corresponding available resource elements may be remaining resources after removing a 4-port virtual cell CRS port. The physical downlink shared channel may be transmitted in a single-port manner.

Signaling is defined respectively for the information of the start OFDM symbol of the physical downlink channel in a subframe and information of one or more available resource elements of the physical downlink channel in a subframe.

The information of the start OFDM symbol of the physical downlink channel in a subframe may occupy 1 bit, indicating a first OFDM symbol, or a $k^{th}$ OFDM symbol, where k may be equal to 3, 4 or 5. Alternatively, the information of the start OFDM symbol of the physical downlink channel in a subframe may occupy 2 bits, indicating the first, second, third or fourth OFDM symbol.

The information of one or more available resource elements of the physical downlink channel in a subframe may be indicated via a CRS port location and/or a CSI-RS port location.

Herein, the CRS port location may be 1, 2 or 4, or, the CRS port location may be 1 or 4. The CSI-RS port location may include Null, or may be one or more selected CSI-RS resource configuration indexes in a relevant LTE system.

The physical shared channel carrying the system message, the synchronization channel and the PBCH may be located on different subframes.

The one or more subframes of the physical shared channel carrying the system message may include one or more of a subframe #0, a subframe #4, a subframe #5 and a subframe #9.

The physical downlink channel may include a physical downlink shared channel and/or a physical downlink control channel.

Another embodiment of the disclosure provides a computer storage medium in which a computer-executable instruction is stored. The computer-executable instruction is used to execute the method in the above-mentioned embodiments.

Those of ordinary skill in the art may understand that all or some of the steps in the above-mentioned method may be completed by instructing relevant hardware (e.g., processor) through a program. The program may be stored in a computer-readable storage medium such as a read-only memory, a magnetic disk or an optical disk. Alternatively, all or some of the steps in the above-mentioned embodiments may be implemented by using one or more integrated circuits. Accordingly, each module/unit in the above-mentioned embodiments may be implemented in a form of hardware, and for example, corresponding functions thereof are implemented by means of an integrated circuit. Each module/unit may also be implemented in a form of software function module, and for example, corresponding functions thereof are implemented by executing programs/instructions stored in a memory by the processor. The disclosure is not limited to the combination of hardware and software in any specific form.

Although the disclosure provides the implementation manners as above, the content is only the implementation manners illustrated for convenience of understanding the disclosure, and is not intended to limit the disclosure. Any person skilled in the art may make any modifications and changes about an implementation form and details without departing from the scope disclosed in the disclosure. However, the scope of protection limited by the disclosure should be determined with reference to the scope defined by the appended claims.

INDUSTRIAL APPLICABILITY

The above-mentioned technical solutions can reduce the interference between signals during spectrum sharing between different systems and reduce the occurrence of simultaneous transmission of different signals over the same resource by different systems, thereby ensuring consistency between a system and a terminal, and improving the data transmission performance.

What is claimed is:

1. A system message transmission method, comprising:
   transmitting a physical shared channel carrying a system message, wherein the system message comprises available resource information of a physical downlink channel, wherein the available resource information of the physical downlink channel comprises: information of one or more unavailable resource elements of the physical downlink channel in a subframe;
   wherein the method further comprises: indicating the information of the one or more unavailable resource elements via a Cell-specific Reference Signal (CRS) port location;
   wherein the indication via the CRS port location is determined by any one of:
   a number of ports;
   a virtual cell identity;
   a number of ports and a virtual cell identity.

2. The method as claimed in claim 1, wherein the system message further comprises system state information, the system state information is used for a terminal to determine any one of:
   whether to access the system;
   how to access the system;
   whether and how to access the system.

3. The method as claimed in claim 1, wherein the system message further comprises information of one or more available subframes of the physical downlink channel.

4. The method as claimed in claim 1, wherein the method further comprises: indicating the information of the one or more unavailable resource elements via the CRS port location and a Channel State Information Reference Signal (CSI-RS) port location.

5. The method as claimed in claim 4, wherein the indication via the CSI-RS port location is determined by any one of:
   a number of ports;
   a virtual cell identity;
   a number of ports and a virtual cell identity.

6. A system message transmission device, comprising:
   a system module, configured to transmit a physical shared channel carrying a system message, wherein the system message comprises available resource information of a physical downlink channel, wherein the available resource information of the physical downlink channel comprises: information of one or more unavailable resource elements of the physical downlink channel in a subframe;
   wherein the device further comprises: an indication module, configured to indicate the information of the one or more unavailable resource elements via a Cell-specific Reference Signal (CRS) port location;
   wherein the indication via the CRS port location is determined by any one of:

a number of ports;
a virtual cell identity;
a number of ports and a virtual cell identity.

7. The device as claimed in claim 6, wherein the system message further comprises system state information, the system state information is used for a terminal to determine any one of:
   whether how to access the system;
   how to access the system;
   whether and how to access the system.

8. The device as claimed in claim 6, wherein the system message further comprises information of one or more available subframes of the physical downlink channel.

9. The device as claimed in claim 6, wherein the indication module is further configured to indicate the information of the one or more unavailable resource elements via the CRS port location and a Channel State Information Reference Signal (CSI-RS) port location.

10. The device as claimed in claim 9, wherein the indication via the CSI-RS port location is determined by any one of:
   a number of ports;
   a virtual cell identity;
   a number of ports and a virtual cell identity.

11. A system message transmission method, comprising:
   receiving a physical shared channel carrying a system message, wherein the system message comprises available resource information of a physical downlink channel, wherein the available resource information of the physical downlink channel comprises: information of one or more unavailable resource elements of the physical downlink channel in a subframe;
   wherein the information of the one or more unavailable resource elements is indicated via a Cell-specific Reference Signal (CRS) port location;
   wherein the indication via the CRS port location is determined by any one of:
      a number of ports;
      a virtual cell identity;
      a number of ports and a virtual cell identity.

12. The method as claimed in claim 11, wherein the system message further comprises system state information, the system state information is used for a terminal to determine whether and/or how to access the system.

13. The method as claimed in claim 11, wherein the system message further comprises information of one or more available subframes of the physical downlink channel.

14. The method as claimed in claim 11, wherein the information of the one or more unavailable resource elements is indicated via the CRS port location and a Channel State Information Reference Signal (CSI-RS) port location.

15. The method as claimed in claim 14, wherein the indication via the CSI-RS port location is determined by any one of:
   a number of ports;
   a virtual cell identity;
   a number of ports and a virtual cell identity.

16. A system message reception device, configured to:
   receive a physical shared channel carrying a system message, wherein the system message comprises available resource information of a physical downlink channel, wherein the available resource information of the physical downlink channel comprises: information of one or more unavailable resource elements of the physical downlink channel in a subframe, the information of the one or more unavailable resource elements is indicated via a Cell-specific Reference Signal (CRS) port location;
   wherein the indication via the CRS port location is determined by any one of:
      a number of ports;
      a virtual cell identity;
      a number of ports and a virtual cell identity.

\* \* \* \* \*